(12) United States Patent
Woolley et al.

(10) Patent No.: US 12,517,020 B2
(45) Date of Patent: Jan. 6, 2026

(54) 3D-PRINTED MICROFLUIDIC DEVICES FOR SOLID-PHASE EXTRACTION AND FLUORESCENT LABELING OF PEPTIDES AND PROTEINS

(71) Applicant: BRIGHAM YOUNG UNIVERSITY, Provo, UT (US)

(72) Inventors: Adam T. Woolley, Orem, UT (US); Anna V. Bickham, Provo, UT (US); Gregory P. Nordin, Lindon, UT (US)

(73) Assignee: Brigham Young University, Provo, UT (US)

( * ) Notice: Subject to any disclaimer, the term of this patent is extended or adjusted under 35 U.S.C. 154(b) by 909 days.

(21) Appl. No.: 17/658,442

(22) Filed: Apr. 7, 2022

(65) Prior Publication Data

US 2022/0334034 A1  Oct. 20, 2022

Related U.S. Application Data

(60) Provisional application No. 63/172,017, filed on Apr. 7, 2021.

(51) Int. Cl.
*G01N 1/40* (2006.01)
*B33Y 80/00* (2015.01)
*G01N 33/58* (2006.01)

(52) U.S. Cl.
CPC .............. *G01N 1/405* (2013.01); *B33Y 80/00* (2014.12); *G01N 33/582* (2013.01); *Y10T 436/255* (2015.01)

(58) Field of Classification Search
CPC ............ G01N 1/28; G01N 1/40; G01N 1/405; G01N 33/582; G01N 33/68; B33Y 80/00; Y10T 436/25; Y10T 436/25375; Y10T 436/255

USPC .......... 436/86, 161, 174, 177, 178; 422/527, 422/535

See application file for complete search history.

(56) References Cited

U.S. PATENT DOCUMENTS 8,076,152 B2 * 12/2011 Robotti .............. G01N 30/6095
                                                             156/1

OTHER PUBLICATIONS

Bickham et al. Analytical Chemistry, vol. 92, Aug. 24, 2020, pp. 12322-11329.*
Almughamsi et al. Analyst, vol. 147, Jan. 20, 2022, pp. 734-743.*
Esene et al. Analytica Chimica Acta, vol. 1296, Feb. 5, 2024, pp. 1-9.*
Ahrberg, C. D.; Manz, A.; Chung, B. G. Lab Chip 2016, 16, 3866-3884.
Beauchamp, M. J.; Gong, H.; Woolley, A. T.; Nordin, G. P. Micromachines 2018, 9, 326.
Beauchamp, M. J.; Nielsen, A. V.; Gong, H.; Nordin, G. P.; Woolley, A. T. Anal. Chem. 2019, 91, 7418-7425.
Beauchamp, M. J.; Nordin, G. P.; Woolley, A. T. Anal. Bioanal. Chem. 2017, 409, 4311-4319.

(Continued)

*Primary Examiner* — Maureen Wallenhorst
(74) *Attorney, Agent, or Firm* — Barnes & Thornburg LLP; Ryan L. Marshall

(57) ABSTRACT

Miniaturized solid-phase extraction (SPE) systems and processes are disclosed. The systems and methods enable preconcentration methods for sample preparation that can be performed on a variety of specimens. The miniaturization of SPE system is accomplished with 3D-printed microfluidic device for fast and simple extraction of analytes.

18 Claims, 8 Drawing Sheets
(4 of 8 Drawing Sheet(s) Filed in Color)
Specification includes a Sequence Listing.

(56) References Cited

OTHER PUBLICATIONS

Brassard, D.; Geissler, M.; Descarreaux, M.; Tremblay, D.; Dauod, J.; Clime, L.; Mounier, M.; Charlebois, D.; Veres, T. Lab Chip 2019, 19, 1941-1952.
Buszewski, B.; Szultka, M. Crit. Rev. Anal. Chem. 2012, 42, 198-213.
Campos, C. D. M.; Gamage, S. S. T.; Jackson, J. M.; Witek, M. A.; Park, D. S.; Murphy, M. C.; Godwin, A. K.; Soper, S. A. Lab Chip 2018, 18, 3459-3470.
Carrasco-Correa, E. J.; Cocovi-Solberg, D. J.; Herrero-Martínez, J. M .; Simó-Alfonso, E. F.; Miró, M. Anal. Chim. Acta 2020, 1111, 40-48.
Deng, J.; Ikenishi, F.; Smith, N.; Lazar, I. M. Electrophoresis 2019, 39, 3171-3184.
Esplin, M. S.; Merrell, K.; Goldenberg, R.; Lai, Y.; Iams, J. D.; Mercer, B.; Spong, C. Y.; Miodovnik, M.; Simhan, H. N.; van Dorsten, P.; Dombrowski, M. Am. J. Obstet. Gynecol. 2011, 204, e1-e8.
Farahani, A.; Sereshti, H. Anal. Bioanal. Chem. 2020, 412, 129-138.
Gong, H.; Bickham, B. P.; Woolley, A. T.; Nordin, G. P. Lab Chip 2017, 17, 2899-2909.
Gong, H.; Woolley, A. T.; Nordin, G. P. Lab Chip 2016, 16, 2450-2458.
Gupta, V.; Beirne, S.; Nesterenko, P. N.; Paull, B. Anal. Chem. 2018, 90, 1186-1194.
Kim, J.; Campbell, A. S.; de Ávila, B. E .; Wang, J. Nat. Biotechnol. 2019, 37, 389-406.
Kimura, H.; Sakai, Y.; Fujii, T. Drug Metab. Pharmacokinet. 2018, 33, 43-48.
Knob, R.; Sahore, V.; Sonker, M.; Woolley, A. T. Biomicrofluidics 2016, 10, 032901.
Kumar, S.; Sahore, V.; Rogers, C. I.; Woolley, A. T. Analyst 2016, 141, 1660-1668.
Mauk, M. G.; Song, J .; Liu, C.; Bau, H. H. Biosensors. 2018, 8, 17.
Nge, P. N.; Pagaduan, J. V.; Yu, M.; Woolley, A. T. J. Chromatogr. A 2012, 1261, 129-135.
Nielsen, A. V.; Beauchamp, M. J.; Nordin, G. P.; Woolley, A. T. Annu. Rev. Anal. Chem. 2020, 13, 45-65.
Nielsen, A. V.; Nielsen, J. B.; Sonker, M.; Knob, R.; Sahore, V.; Woolley, A. T. Electrophoresis 2018, 39, 2300-2307.
Nielsen, J. B.; Nielsen, A. V.; Carson, R. H.; Lin, H.-J. L.; Hanson, R. L.; Sonker, M.; Mortensen, D. N.; Price, J. C.; Woolley, A. T. Electrophoresis 2019, 40, 2853-2859.
Park, M.; Seo, T. S. Biosens. Bioelectron. 2019, 126, 405-411.
Parker, E. K.; Nielsen, A. V.; Beauchamp, M. J.; Almughamsi, H. M.; Nielsen, J. B.; Sonker, M.; Gong, H.; Nordin, G. P.; Woolley, A. T. Anal. Bioanal. Chem. 2019, 411, 5405-5413.
Prakadan, S. M.; Shalek, A. K.; Weitz, D. A. Nat. Rev. Genet. 2017, 18, 345-361.
Rothbauer, M.; Zirath, H.; Ertl, P. Lab Chip 2018, 18, 249-270.
Sahore, V.; Sonker, M.; Nielsen, A. V .; Knob, R .; Kumar, S.; Woolley, A. T. Anal. Bioanal. Chem. 2018, 410, 933-941.
Simm, S.; Einloft, J.; Mirus, O.; Schleiff, E. Biol. Res. 2016, 49, 31.
Sonker, M.; Parker, E. K.; Nielsen, A. V.; Sahore, V.; Woolley, A. T. Analyst 2018, 143, 224-231.
Sonker, M.; Sahore, V.; Woolley, A. T. Anal. Chim. Acta 2017, 986, 1-11.
Survive and thrive: transforming care for every small and sick newborn; World Health Organization: Geneva, 2019.
Svejdal, R. R.; Dickinson, E. R.; Sticker, D.; Kutter, J. P.; Rand, K. D. Anal. Chem. 2019, 91, 1309-1317.
Makh, E. G.; Tennikova, T. B. J. Sep. Sci. 2007, 30, 2801-2813.
Wu, J.; Gu, M. J. Biomed. Optics 2011, 16, 080901.
Wu, Q.; He, J.; Meng, H.; Wang, Y.; Zhang, Y.; Li, H.; Feng, L. Talanta 2019, 204, 518-524.
Yang, R.; Pegaduan, J. V .; Yu, M.; Woolley, A. T. Anal. Bioanal. Chem. 2015, 407, 737-747.
Yu, C.; Davey, M. H.; Svec, F.; Fréchet, J. M. J. Anal. Chem. 2001, 73, 5088-5096.
Zhang, L.; Ding, B.; Chen, Q.; Feng, Q.; Lin, L.; Sun, J. TrAC, Trends Anal. Chem. 2017, 94, 106-116.
Zhang, Y.; Xiang, J.; Wang, Y.; Qiao, Z.; Wang, W. Sens. Actuators, B 2019, 296, 126603.
Zhao, C.; Ge, Z.; Yang, C. Micromachines 2017, 8, 28.

\* cited by examiner

3D-PRINTED MICROFLUIDIC DEVICES FOR SOLID-PHASE EXTRACTION AND FLUORESCENT LABELING OF PEPTIDES AND PROTEINS

FEDERAL SUPPORT

This invention was made with government support under Grant Numbers R01 EB027096 and R15 GM123405-01A1 awarded by the National Institutes of Health. The government has certain rights in the invention.

CROSS-REFERENCE TO RELATED APPLICATIONS

A sequence listing entitled "82570-356302_Sequence-_Listing_2022-12-01_ST25.txt" is an ASCII text file and is incorporated herein by reference in its entirety. The text file was created on Dec. 1, 2022, and is 9.35 KB in size.

REFERENCE TO SEQUENCE LISTING

A sequence listing entitled "PTB_peptides.txt" is an ASCII text file and is incorporated herein by reference in its entirety. The text file was created on Apr. 7, 2022 and is 1.30 KB in size.

TECHNICAL FIELD

The disclosure generally relates to microfluidic devices, their manufacture, and use, in the separation, detection, and processing of biomolecules.

BACKGROUND

Over the past 30 years, the field of microfluidics has established advantages of low sample and reagent consumption, fast analyses, and cost-effectiveness compared to many benchtop instruments and processes. These benefits are apparent in a variety of applications, including biomarker, nucleic acid, organ-on-a-chip, single- and multi-cellular, polymerase chain reaction, and biosensor analyses. Conventional microfabrication methods previously limited the design capabilities of these microfluidic devices. Accordingly, there is a need to miniaturize, iteratively customize, and integrate more sample preparation and analysis methods into fluidic chips. The availability of 3D printers capable of producing <100-μm channels is limited, therefore, there is particularly need for achieving precise microfluidic devices to achieve enclosed, truly microfluidic features.

For growing applications in microfluidics, there is a persistent need to detect lower analyte concentrations. Indeed, the use of small sample volumes in microchannels has a major influence on the approach needed for detection of analytes of interest. Often, lowering the analyte limit of detection must begin during sample preparation by limiting losses and implementing preconcentration. Although there are many methods for preconcentration, solid-phase extraction (SPE) is one of the most general ones, because it can be applied to relatively larger sample volumes.

Miniaturization of an SPE system may allow for integration with other analysis steps and can be simple, fast, and effective. Many different SPE systems have been developed previously for microfluidic applications, including for analysis of alkaloids, metal ions, nucleic acids, aromatic hydrocarbons, and phosphopeptides. These applications often utilize a variety of SPE sorbent beds such as packed beads, micro- or nanofibers, porous polymer monoliths, membranes, or other microstructures to achieve high surface areas and appropriate chemical properties for effective extraction.

Monoliths can be particularly useful because of their ease of in situ fabrication and morphological tuning. While there are reports of monoliths in 3D printed fluidic devices for hydrogen/deuterium exchange, immunoaffinity extraction, liquid chromatography, and SPE of alkyl esters on a gold nanoparticle modified monolith, these techniques were not truly microfluidic (i.e. they had cross sections smaller than $100 \times 100$ μm$^2$) or suffered from other undesirable parameters and effects.

BRIEF SUMMARY

In one aspect, a method of identifying biomolecules is disclosed. The method includes providing a porous, monolith substrate from a 3D printer, the monolith substrate having one or more monolith columns and one or more ports; loading an analyte containing sample into the one or more monolith columns; eluting a solvent through the one or more monolith columns; and identifying the presence or amount of an analyte from the analyte containing sample.

In another aspect, a method of concentrating a target analyte is disclosed. The method includes providing a porous, monolith substrate from a 3D printer, the monolith substrate having one or more monolith columns and one or more ports; loading an analyte containing sample into the one or more monolith columns in which the analyte adheres to the one or more monolith columns; loading a buffer solution through the one or more monolith columns; and eluting the analyte from the one or more monolith columns.

In another aspect, a method of concentrating a target analyte is disclosed. The method includes providing a porous, monolith substrate from a 3D printer, the monolith substrate further comprising: one or more monolith columns and one or more ports; loading an analyte containing sample into the one or more monolith columns in which the analyte adheres to the one or more monolith columns; loading a buffer solution through the one or more monolith columns; and eluting the analyte from the one or more monolith columns.

In some embodiments, the monolith column is made from a polymerized monomer. In some embodiments, the monolith column is made from polymerized lauryl methacrylate monomer.

In some embodiments, the methods include applying a vacuum pressure to the one or more port. In some embodiments, the methods include fluorescently tagging the biomolecule. In some embodiments, the one or more monolith columns is a plurality of monolith columns. In some embodiments, the plurality of monolith columns is in fluid communication with a corresponding port.

In another aspect, a system for solid-phase extraction and on-chip fluorescent labeling is disclosed. The system has an extraction chip with a porous, monolith substrate from a 3D printer, the monolith substrate further comprising: one or more monolith columns and one or more ports; a buffer solution; a loading solution; a fluorescent labeling solution; and a first elution solution.

In some embodiments, the monolith column is made from a polymerized monomer. In some embodiments, the monolith column is made from polymerized lauryl methacrylate monomer. In some embodiments, the system also includes a pump in fluid communication with the one or more ports. In some embodiments, the system also includes a fluorescent labeling solution. In some embodiments, the one or more monolith columns is a plurality of monolith columns. In some embodiments, the plurality of monolith columns is in fluid communication with a corresponding port. In some embodiments, the system includes a second elution solution.

The foregoing broadly outlines the features and technical advantages of the present disclosure in order that the detailed description that follows may be better understood. Additional features and advantages of the disclosure will be described hereinafter that form the subject of the claims of this application. It will be appreciated by those of skill in the art that the conception and specific aspects disclosed herein may be readily utilized as a basis for modifying or designing other aspects for carrying out the same purposes of the present disclosure within the spirit and scope of the disclosure and provided in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A detailed description of the invention is hereafter provided with specific reference being made to the drawings in which:

(FIGS. 1A-B) Top- and side-views of the CAD design of 3D printed devices, which have five identical channels (light blue) with reservoirs (yellow) and vacuum-attachment ports (gray). A polymerization window (blue) also runs perpendicular through the device, 60 μm above the channels.
(FIG. 1C) Photograph of a 3D printed device.
(FIGS. 1D-E) SEM images of an LMA monolith polymerized within a 70×50 μm² channel, demonstrating wall adhesion and porosity.
(FIG. 3A) Photograph of a monolith showing formation and confinement within the polymerization window (visible as the two dark lines running horizontally through the image).
(FIG. 3B) Fluorescence images of successive steps during SPE experiments including buffer equilibration, sample loading (Alexa Fluor or ferritin), buffer rinse, 30% ACN elution, and 90% ACN elution. Scale is the same in all images.
(FIG. 5A) Normalized fluorescent signal on the monolith after loading/labeling, buffer rinse, 30% ACN, and 90% ACN elution steps.
(FIG. 5B) Percent of the total retained analyte eluted with 90% ACN.

DETAILED DESCRIPTION

Figure 1A:
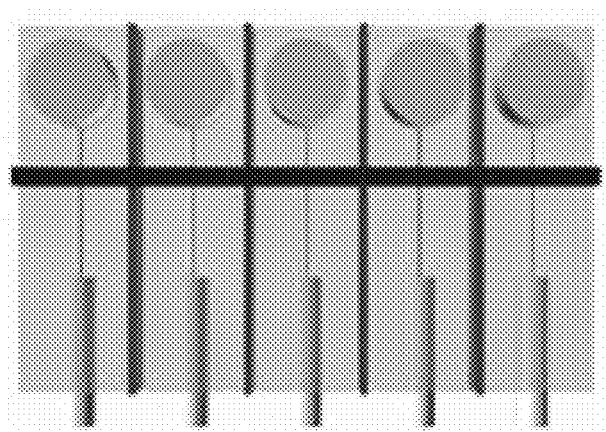
FIGS. 1A-E depict 3D printed microfluidic devices with monoliths for SPE and on-chip labeling experiments.

Various aspects are described below with reference to the drawings. The relationship and functioning of the various elements of the aspects may better be understood by reference to the following detailed description. However, aspects are not limited to those illustrated in the drawings or explicitly described below. It should be understood that the drawings are not necessarily to scale, and in certain instances, details may have been omitted that are not necessary for an understanding of aspects disclosed herein, such as conventional fabrication and assembly. Headings are provided for the convenience of the reader and to assist organization of the disclosure and should not be construed to limit or otherwise define the scope of the invention.

Each year, nearly 15 million infants are born prematurely, resulting in over 1 million deaths worldwide from either the direct effects of preterm birth (PTB) or later complications, such as respiratory difficulties or increased susceptibility to infection. The World Health Organization has a number of recommended interventions to reduce mortality rates, but they are mainly focused on care during labor and after delivery. In part, this is because no early clinical assessment currently exists to give warning of an imminent PTB prior to the onset of labor. Such an assessment may be possible with a panel of nine previously discovered protein and peptide biomarkers, summarized in Table 1. Toward development of a PTB risk assessment, some of these protein and peptide biomarkers have been evaluated in microfluidic devices for immunoaffinity extraction, electrophoretic separations, and SPE. This entire panel, however, has not previously been evaluated in a microfluidic analysis format.

TABLE 1

PTB biomarkers, their molecular masses, and weighted calculations of the hydrophobicity of their amino acid composition.

| | Mass | Amino Acid Characterization | | |
|---|---|---|---|---|
| Biomarker | (kDa) | Hydrophobic | Neutral | Hydrophilic |
| Peptide 1 | 2.0 | 58% | 21% | 21% |
| CRF | 2.7 | 49% | 20% | 32% |
| Peptide 2 | 4.2 | 50% | 30% | 20% |
| Peptide 3 | 4.2 | 48% | 30% | 23% |
| Defensins | 3-20 | 41 ± 7% | 24 ± 5% | 35 ± 6% |
| TNF | 26 | 38% | 38% | 24% |
| Lactoferrin | 80 | 39% | 35% | 25% |
| TAT | 120 | 39% | 33% | 28% |
| Ferritin | 420 | 37% | 33% | 30% |

The present application shows the development of a reversed-phase monolith for SPE of PTB biomarkers. These monoliths are photopolymerized within 3D printed microfluidic device channels, allowing for easy and fast device fabrication. The SPE devices were evaluated for retention and elution of nine PTB biomarkers as well as a fluorescent label, Alexa Fluor 532 NHS ester. Finally, these 3D printed microfluidic devices were tested, using the same nine PTB biomarker analytes, for performing on-chip SPE and fluorescent labeling. Notably, these 3D printed devices and reversed-phase monoliths are well-suited for SPE retention and elution of PTB biomarkers during on-chip labeling. Our results demonstrate nearly universal retention and elution performance for SPE of a diverse panel of protein and peptide biomarkers, marking an important step toward the development of a complete miniaturized PTB risk assessment.

EXAMPLES

Materials and Methods

Materials

The following chemicals were ordered from Sigma (St. Louis, MO): poly(ethylene glycol) diacrylate (PEGDA; MW 250 Da), phenylbis(2,4,6-trimethylenzoyl)phosphine oxide (Irgacure 819), acetonitrile (ACN), 1-dodecanol, ethylene dimethacrylate (EDMA), lauryl methacrylate (LMA), octyl methacrylate (OMA), 2,2-dimethoxy-2-phenylacetophenone (DMPA), 3-(trimethoxysilyl)propyl methacrylate, and dimethyl sulfoxide (DMSO). PTB biomarkers were purchased from the following sources: PTB peptides 1-3 (synthesized by Biomatik, Wilmington, DE; see Table S1), corticotropin-releasing factor (CRF, GenScript, Piscataway, NJ), defensins (mixed human neutrophil peptides, Athens Research and Technology, Athens, GA), ferritin (EMD Millipore, Billerica, MA), lactoferrin (Sigma), tumor necrosis factor-α receptor type 1 (TNF, ProSpec, East Brunswick, NJ), thrombin and antithrombin (Haematologic Technology, Essex Junction, VT), and heparin (Alfa-Aesar, Haverhill, MA). Fluorescent labeling of biomarkers was performed using Alexa Fluor 532 NHS ester (Thermo Fisher, Fair Lawn, NJ) with filtering in Amicon Ultra 0.5 mL centrifugal cutoff filters (EMD Millipore). Bicarbonate buffer (BCB, pH 10) was prepared using sodium bicarbonate from Merck (Darmstadt, Germany) and sodium hydroxide from Mallinckrodt Baker (Paris, KY). 2-nitrophenyl phenyl sulfide (NPS, TCI Chemicals, Portland, OR) and glass slides (25 mm×75 mm×1 mm; VWR, Center Valley, PA) were purchased for 3D printing. Additional solvents of isopropyl alcohol (IPA) and toluene came from Macron. Finally, all water was purified to 18.3 MΩ·prior to use (Barnstead EASY-Pure UV/UF, Dubuque, IA).

horizontal port, into which PTFE tubing (0.022 in ID×0.042 in OD; Cole Parmer, Vernon Hills, IL) is inserted for the application of vacuum for flow through the channel. The device also includes a 600 µm wide monolith polymerization window, placed 60 µm above the channel. CAD designs of the devices can be seen in FIGS. 1A-B.

Microfluidic devices were formed in a custom 3D printer with a 385 nm light source. The resin consisted of 2% NPS and 1% Irgacure 819 in PEGDA. The exposure time for each layer in the bulk material was 600 ms with 200 ms less exposure in the 3 pixels (~22 µm) to the side of and 3 layers (~30 µm) above the channel region to widen the channels (70 µm×50 µm) beyond the designed size. All 3D prints were exposed with a measured optical irradiance of 21 mW·cm$^{-2}$ in the image plane.

Monolith Preparation

Reversed-phase monolithic columns were prepared using 1% DMPA photoinitiator in a mixture of monomer (LMA or OMA), crosslinker (EDMA), and porogens (1-dodecanol and/or cyclohexanol). Initially, these mixtures were polymerized in microcentrifuge tubes for 10 min under a UV lamp (Uvitron, West Springfield, MA) to analyze the degree of photopolymerization in each mixture. Analysis was performed by visual inspection. Once a suitable range of component compositions was identified using this approach, mixtures were polymerized in 3D printed device channels. No channel surface treatment prior to monolith formation was required. After photopolymerization, some channels were sectioned with a razor blade and imaged using SEM (Helios Nanolab 600 FEI, Fisher), and others were experimentally tested by performing SPE of a PTB biomarker. SEM images were analyzed using Image J software (NIH; imagej.nih.gov) to determine average pore and nodule sizes. Each monolith formulation was analyzed for flow when vacuum was applied; morphology of nodules and pores; and PTB biomarker extraction, retention, and elution. These criteria allowed for a well-suited mixture to be decided upon and used for SPE and on-chip labeling of all nine PTB biomarkers. Experimental procedures for contact angle measurements of OMA:EDMA and LMA:EDMA mixtures are given in the Supporting Information.

TABLE S1

Amino acid sequences for three preterm birth risk peptide biomarkers. M(O) denotes oxidized methionine.

| Peptide | Amino Acid Sequence |
|---|---|
| PTB Peptide 1 | QLGLPGPPDVPDHAAYHPF |
| PTB Peptide 2 | NVHSAGAAGSRMNFRPGVLSSRQLGLPGPPDVPDHAAYHPF |
| PTB Peptide 3 | NVHSAGAAGSRM(O)NFRPGVLSSRQLGLPGPPDVPDHAAYHPF |

3D Printing

Microfluidic devices are designed in the freeware computer-aided design (CAD) software, OpenSCAD (openscad.org); each print has 10-µm-thick layers and includes five identical devices. The design is adapted from one used by Parker et al. (3D printed microfluidic devices with immunoaffinity monoliths for extraction of preterm birth biomarkers. Anal. Bioanal. Chem. 2019, 411, 5405-5413; see also U.S. Pat. No. 10,597,289 incorporated herein by reference). A 6-pixel (46 µm) by 5-layer (50 µm) channel connects a 2.7 mm diameter×0.75 mm deep reservoir to a 1.1 mm diameter After polymerization of monoliths within the 3D printed device channels, PTFE tubing was inserted into the horizontal port for each channel and affixed with hot glue, then IPA was drawn by vacuum through each channel for a minimum of 30 min. Cleaning was complete when a channel and monolith could be successfully brought to complete dryness by vacuum. If residual liquid could not be removed by vacuum, additional IPA, device heating to ~35° C., and vacuum were applied. Monoliths in microfluidic devices prepared in this manner could then be stored under ambient conditions until use.

Experimental Setup

PTB biomarkers were fluorescently labeled and filtered using previously described procedures for prelabeled biomarker experiments. Thrombin-antithrombin complex (TAT) was prepared 24 hours prior to fluorescent labeling. For on-chip labeling experiments, PTB biomarkers were diluted to the desired concentration in 10 mM BCB.

SPE experiments were performed using microscope setup for laser-induced fluorescence detection. Fluorescence images were collected with either a Photometrics CoolSNAP HQ2 CCD camera (Tucson, AZ) or a Hamamatsu ORCA-Fusion CMOS camera (Bridgewater, NJ). Prior to biomarker extraction, a monolith was prepared by adding IPA to the reservoir and allowing the channel to fill to the monolith by capillary action. Next, the IPA was replaced with 10 mM BCB (pH 10), and vacuum was applied for 3 minutes. Then, the liquid in the reservoir was replaced with 30% ACN (in 10 mM BCB), with vacuum application for 90 s. Finally, the same was done with 90% ACN for another 90 s. This process of flowing buffer, 30% ACN, and 90% ACN was repeated three times to clean and equilibrate the channel The flow rate was estimated to be 0.5-1 µL/min by monitoring the emptying time for a measured volume of fluid in filled reservoirs.

After equilibration, SPE experiments were performed. For prelabeled biomarkers, vacuum was used to drive the following flow steps: BCB for 3 minutes, sample loading for 90 s, BCB buffer rinse three times for 90 s each, 30% ACN for 90 s, and 90% ACN for 90 s. Although most analytes were tested at several concentrations, the following concentrations were used for each analyte for the reported data: ferritin, 10 nM; TNF, 100 nM; peptide 1, 500 nM; defensins, 200 nM; CRF, peptides 2-3, TAT, and lactoferrin 1 µM; and Alexa Fluor, 2 µM. For on-chip labeling experiments, a similar procedure was performed except two loading steps were performed (PTB biomarker for 90 s, then Alexa Fluor labeling solution for 90 s) followed by a 30 min incubation prior to the buffer rinse. During the incubation time, the reservoir was refilled with labeling solution as needed to prevent evaporative drying. For the reported data, the following concentrations were used for each analyte: peptide 1, 500 nM; CRF, 1 µM; peptides 2-3, 600 nM; defensins, 200 nM; lactoferrin, 60 nM; TNF, 100 nM; TAT and ferritin, 50 nM; and Alexa Fluor, 20 µM. For this study, biomarker concentrations are higher than reported clinically relevant levels to allow easy signal detection during retention and elution. The analyte enrichment capabilities of our approach allow future studies with biomarker concentrations at or below the reported action levels.

After each flow step, a fluorescence image was captured using 200 ms exposure (for both detectors). All images were analyzed using Image J to obtain the fluorescent signal present on the monolith after each step of the process. The background signal was subtracted from each, then the values were normalized to the signal after sample loading for each experiment. Average signals from three replicates for each experiment are reported.

Many protein hydrophobicity calculation algorithms exist that account for both amino acid sequence and protein tertiary structure. For this study, calculations for biomarker hydrophobicity were performed using the amino acid sequence of each biomarker and an online hydrophobicity index (www.peptide2.com/N_peptide_hydrophobicity_hydrophilicity.php). Because retained analytes were dissolved in pH 10 solutions where some denaturation may occur, hydrophobicity differences due to tertiary structure were not considered.

Figure 1B:
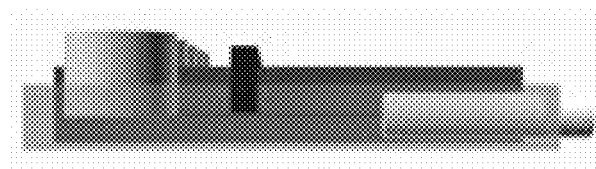
Figure 1C:
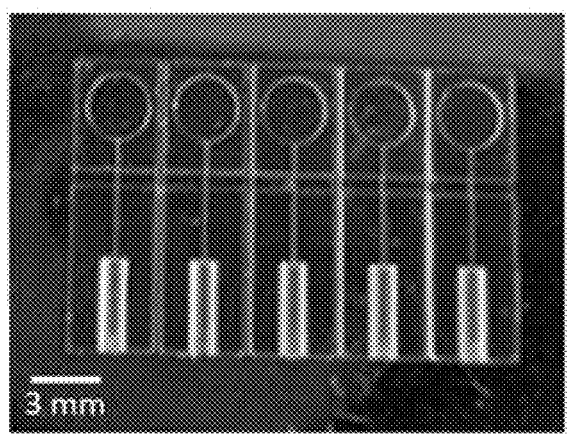

Results and Discussion 3D printed microfluidic devices for SPE were based on a design used previously by Parker et al. (3D printed microfluidic devices with immunoaffinity monoliths for extraction of preterm birth biomarkers. Anal. Bioanal. Chem. 2019, 411, 5405-5413; see also U.S. Pat. No. 10,597,289 incorporated herein by reference). The design, however, was changed slightly by creating a horizontal port for attachment of external tubing, which allowed for easier interfacing with vacuum to drive fluid flow (FIGS. 1A-C). Because 3D printing was used for device fabrication, design modifications were straightforward to apply; the CAD design could be edited, and new devices could be 3D printed in less than 30 min. These devices absorb UV light strongly ($h_a$=10.8 µm at 385 nm) but have high transmittance for visible wavelengths (99.8% transmittance at 532 nm).

A new formulation was developed for these SPE experiments both to improve formation consistency and to avoid the use of Tween-20, which can be incorporated into the monolith during polymerization and unnecessarily complicates monolith formulation as an additional component. For initial development of the new monolith, a number of mixtures containing OMA (10-28%), EDMA (7-25%), 1-dodecanol (45-70%), cyclohexanol (0-12%), and DMPA (1%) were mixed and polymerized in microcentrifuge tubes. Our initial choice of OMA was based on previous work where it provided suitable monolith hydrophobicity to selectively retain and elute protein biomarkers. Visual inspection found that mixtures containing too high of a porogen content (not enough monomer and crosslinker) were viscous and transparent, while mixtures that did not contain enough porogens (too much monomer and crosslinker) were also transparent from lack of a porous structure. The most opaque mixtures were judged to have formed the most porous monolithic structures; these occurred when the total porogen content was 60-70% and the EDMA crosslinker accounted for at least 15% of the mixture.

Using these results, another series of mixtures containing the same components was prepared (Table 2), placed in 3D printed microfluidic channels for polymerization and imaged with SEM (FIGS. 2A-L). From the formation and flow properties of these monoliths, several observations can be made. First, monoliths that contained a higher porogen (1-dodecanol and cyclohexanol) content had higher flow rates than those with lower porogen content: the flow rates of monolith formulations A-B were slower than those of formulations C-D, which were slower than those of formulations E-F. This meant that after polymerization was complete, it was more difficult to clear the unpolymerized material from monolith formulations A-B than formulations E-F. Thus, those low-porogen-content monoliths (formulations A-B) were judged too dense for use in SPE experiments.

TABLE 2

Formulations, and mean ± standard deviation (each n = 50) nodule and pore sizes for monoliths consisting of 1% DMPA initiator in a mixture of OMA, EDMA, 1-dodecanol, and cyclohexanol. Formulations also correspond to panel letters in FIGS. 2A-L. Formulations A-F maintained a 1:1 OMA:EDMA ratio while varying the OMA + EDMA:porogen ratio. Formulations G-L maintained a 65% total porogen content while varying the OMA:EDMA ratio.

| Monolith Formulation | OMA (%) | EDMA (%) | 1-Dodecanol (%) | Cyclohexanol (%) | Average Nodule Size (μm) | Average Pore Size (μm) |
|---|---|---|---|---|---|---|
| A | 20 | 20 | 50 | 10 | 0.14 ± 0.04 | 0.21 ± 0.09 |
| B | 20 | 20 | 60 |  | 0.89 ± 0.19 | 0.98 ± 0.58 |
| C | 17.5 | 17.5 | 55 | 10 | 0.91 ± 0.56 | 1.21 ± 0.34 |
| D | 17.5 | 17.5 | 65 |  | 1.51 ± 0.39 | 2.19 ± 1.36 |
| E | 15 | 15 | 60 | 10 | 1.48 ± 0.35 | 2.55 ± 1.04 |
| F | 15 | 15 | 70 |  | 0.41 ± 0.08 | 0.58 ± 0.24 |
| G | 20 | 15 | 55 | 10 | n/a | n/a |
| H | 20 | 15 | 65 |  | 0.32 ± 0.05 | 0.33 ± 0.17 |
| I | 15 | 20 | 55 | 10 | 0.45 ± 0.07 | 0.67 ± 0.21 |
| J | 15 | 20 | 65 |  | 0.85 ± 0.13 | 1.51 ± 0.73 |
| K | 10 | 25 | 55 | 10 | 1.25 ± 0.18 | 1.87 ± 0.80 |
| L | 10 | 25 | 65 |  | 0.93 ± 0.25 | 1.50 ± 0.88 |

A second observation from images in FIGS. 2A-L is distinct morphological differences when the entire porogen content is comprised of 1-dodecanol (FIGS. 2B, 2D, 2F, 2H, 2J, and 2L) instead of if the mixture also contains 10% cyclohexanol (FIGS. 2A, 2C, 2E, 2G, 2I, and 2K). We expected that the use of only 1-dodecanol would result in a greater number of smaller pores whereas the addition of cyclohexanol would result in fewer, but larger pores due to greater solubility of the OMA monomer in dodecanol. These images suggest, however, that the effects of these porogens may be more complex; morphological differences from porogen content, while significant, did not follow a simple trend.

Figure 2A:
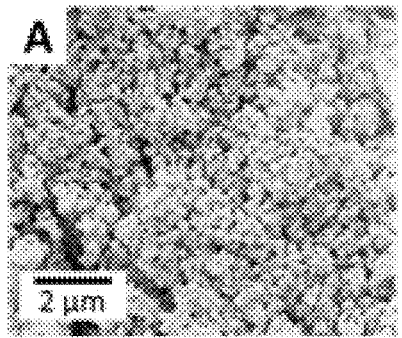
FIGS. 2A-L depict SEM images of monoliths in 3D printed microfluidic channels. Each image letter corresponds to the monolith formulation given in Table 2.
Figure 2B:
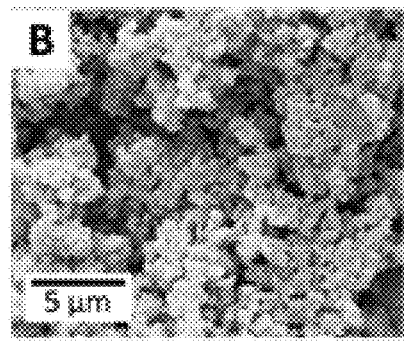
Figure 2C:
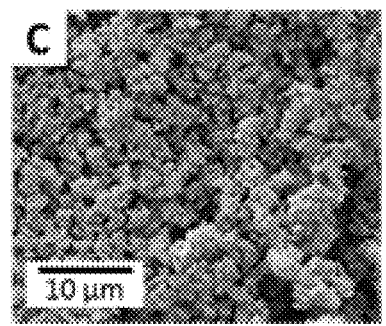
Figure 2D:
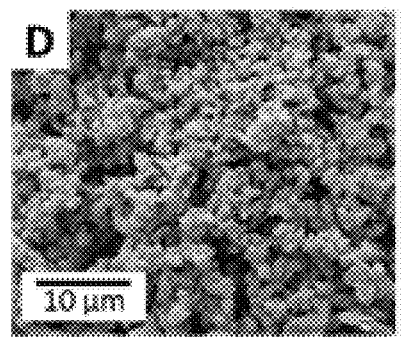
Figure 2E:
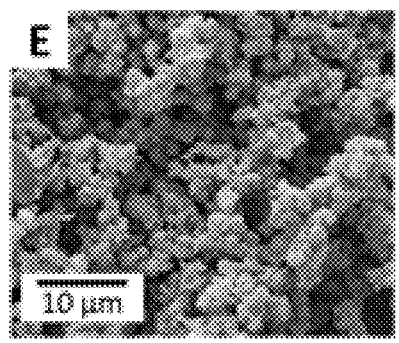
Figure 2F:
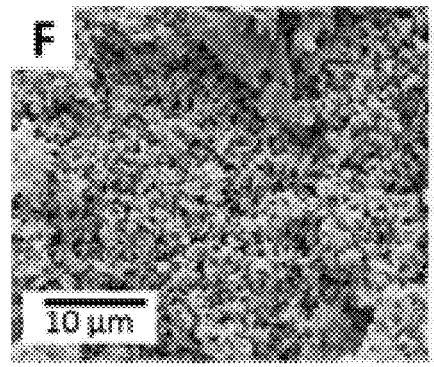
Figure 2G:
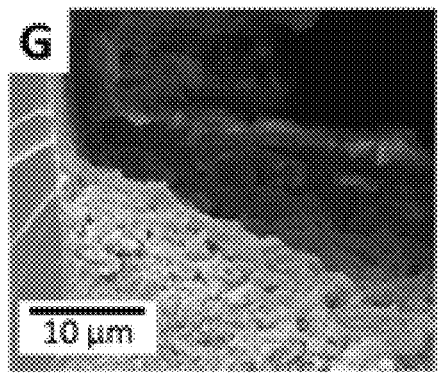
Figure 2H:
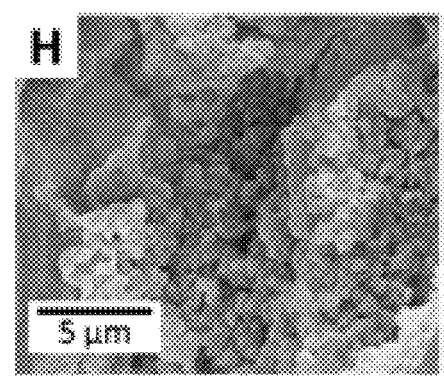
Figure 2I:
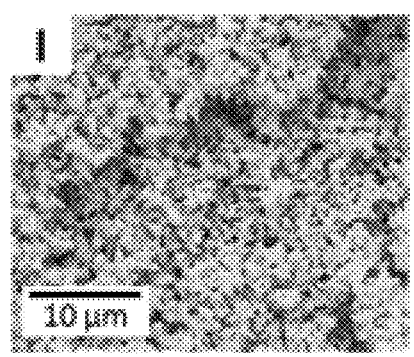
Figure 2J:
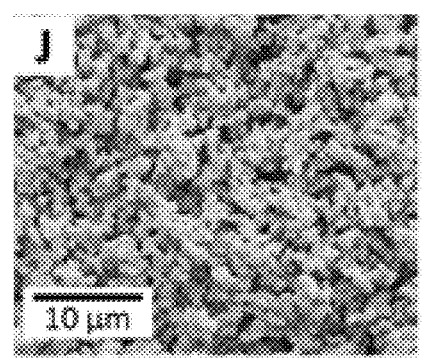
Figure 2K:
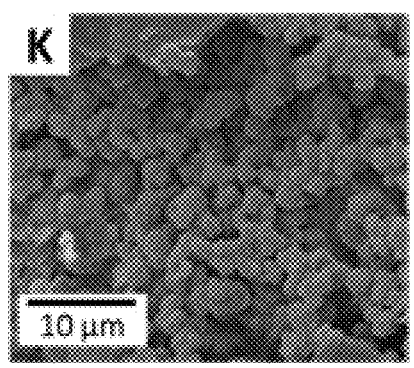
Figure 2L:
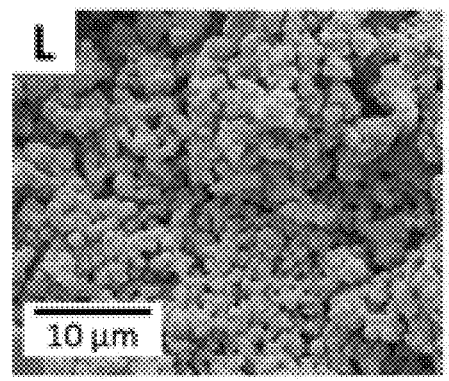

A further observation from monolith formulations G-L is the effect of maintaining constant porogen content while changing the ratio of OMA to EDMA (monomer to crosslinker). FIGS. 2G-H shows, similar to the microcentrifuge tube experiments described earlier, that monolith formation is inconsistent when there is not enough crosslinker present in the mixture. Thus, we see in these images that the monoliths are dense in some regions while other areas lack a monolith structure. We also observe that as the crosslinker concentration increases, the monolith pore and nodule sizes also increase (compare the Table 2 pore and nodule sizes for monolith formulations I-J with K-L). This is likely because the greater number of reactive groups in EDMA draws the polymerizable units in the mixture into a larger, more rigid structure than when a higher percentage of OMA is present. These results indicate that the nodule and pore sizes, and thus the total surface area of the monolith, are tunable by changing the ratio of polymerizable groups in the monomer and crosslinker components.

The results in FIGS. 2A-L and Table 2 confirmed that several mixtures were good candidates for performing SPE. Specifically, monolith formulations C, F, J, and L appeared to be most promising, with good morphology and high surface area. To simplify the mixture, formulation C was excluded as it required two porogens. The remaining three monoliths were tested using a simple SPE experiment. We found that the vacuum-driven flow rate through monoliths from formulation F was too high for efficient extraction to occur due to insufficient interaction between the monolith surface and PTB-related analytes. Although a smaller pressure drop might be able to slow the flow rate enough to correct this, no additional experiments were performed with this mixture or to quantitatively determine an optimal flow rate for extraction. Extraction was also inefficient for monoliths from formulation L, likely due to the low percentage of OMA in this formulation; the monolith was not hydrophobic enough to effectively extract ferritin, a model PTB protein biomarker.

Figure 1D:
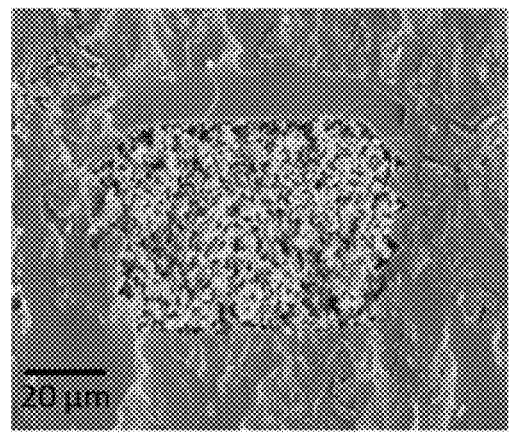
Figure 1E:
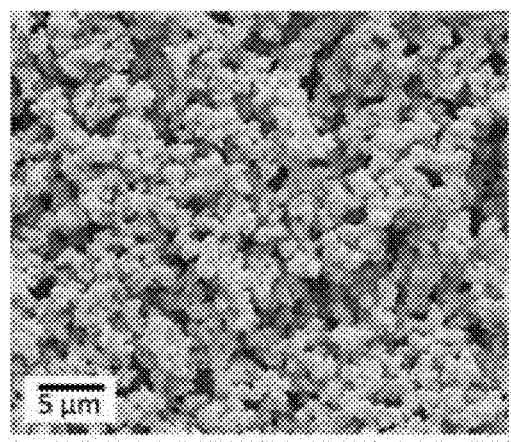
Figure 3A:
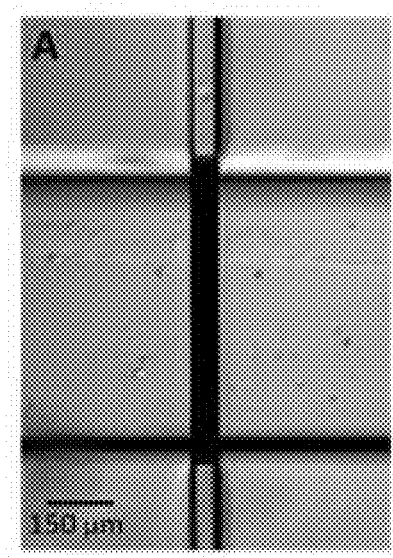
FIGS. 3A-B depict images of reversed-phase LMA monoliths during SPE.

The 15% OMA, 20% EDMA, and 65% 1-dodecanol monolith formulation was used in initial SPE experiments. Although the flow rate and hydrophobicity of this monolith were sufficient for extraction of ferritin, it did not allow for selective elution of excess fluorescent dye prior to the biomarker. For example, flow of just 30% ACN led to partial elution of ferritin. These results indicated that a more hydrophobic monolith was needed to retain all PTB biomarkers, particularly the smaller peptides. Since increasing the OMA percentage detrimentally altered the monolith morphology, instead, the OMA in the monolith from FIG. 2J was replaced with LMA. This change had no noticeable effect on monolith morphology (compare FIG. 1E with FIG. 2J) but increased the hydrophobicity of the monolith (see contact angle data in Table S2) enough to allow for PTB biomarker SPE with selective retention and elution. This LMA monolith was also found to have consistent attachment to the 3D printed channel surfaces (FIG. 1D) and was well-confined to the polymerization window (FIG. 3A). With these encouraging results, no additional monolith optimization was performed with LMA-containing formulations.

TABLE S2

Water contact angles for polymerized 3:4 OMA:EDMA and LMA:EDMA mixtures

| Mixture | Water Contact Angle |
|---|---|
| OMA:EDMA | 57.2 ± 4.8° |
| LMA:EDMA | 60.8 ± 3.2° |

The monoliths used for primary experiments were too small for direct measurement using conventional methods (only $2.1 \times 10^{-3}$ mm$^3$), and polymerization of a larger amount of material can change the porous structure. As an approximation of the contact angles of OMA and LMA monoliths, 3:4 mixtures of OMA:EDMA and LMA:EDMA, the same component ratios as in the monoliths but without the porogens, were polymerized on glass slides. The water contact angle was then measured in triplicate for each non-porous surface.

With a suitable monolith formulation, the 3D printed microfluidic devices were ready for SPE experiments. In initial studies, we found that a fluorescent byproduct of Irgacure 819, the photoinitiator used during 3D printing, was present in the devices and soluble in the ACN eluent. This fluorescent impurity increased the background signal during point fluorescence detection experiments; however, imaging of fluorescence on the monoliths allowed effective monitoring of analyte present during extraction and elution without interference from the impurity.

Using fluorescent imaging detection, the signal after the loading and elution of analytes could be monitored. We selected ferritin as a model biomarker analyte because its large size was expected to lead to strong retention on the reversed-phase monolith. To evaluate conditions for on-chip labeling, Alexa Fluor dye was used as another analyte for initial comparisons. The BCB (pH 10) was used for loading. This matching of immunoaffinity eluent to SPE loading solution should facilitate integration of these two processes in a future PTB risk diagnostic.

Figure 3B:
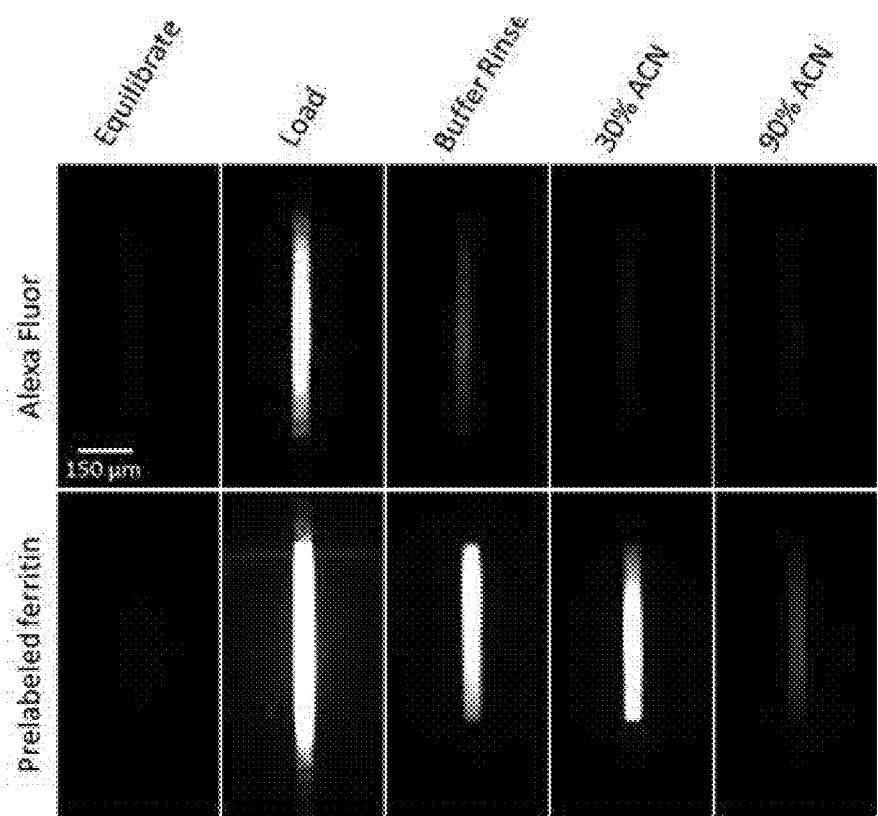

The rinsing and elution solvents for Alexa Fluor and Alexa Fluor-labeled ferritin were chosen to allow for selective elution of the two analytes. Selective elution is for on-chip labeling should allow biomarkers to be eluted in a small-volume, concentrated plug. Such an enriched band should help to lower limits of detection and enable heart-cut injection for subsequent microchip electrophoresis. We found that Alexa Fluor could be eluted with only buffer or at low ACN concentrations. In contrast, the ferritin was strongly retained until 90% ACN was flowed through the monolith, at which time significant elution could be observed. FIG. 3B shows representative images for both Alexa Fluor and ferritin elution. In each case, almost no fluorescent signal can be seen on the monolith during the buffer equilibration prior to sample loading. After loading, both monoliths show high fluorescent signal. In the Alexa Fluor experiments, the fluorescent signal is removed with buffer and 30% ACN, such that almost no fluorescent signal is visible in the image after 30% ACN flow. This indicates limited retention of Alexa Fluor with almost no material remaining after flowing 30% ACN. In contrast, the ferritin images show that the high fluorescent signal is maintained through the buffer and 30% ACN steps, demonstrating that ferritin is well retained. Lastly, the fluorescent signal on the monolith is lower after the 90% ACN elution, indicating good elution of the analyte and selective retention of ferritin compared to Alexa Fluor dye.

Figure 4A:
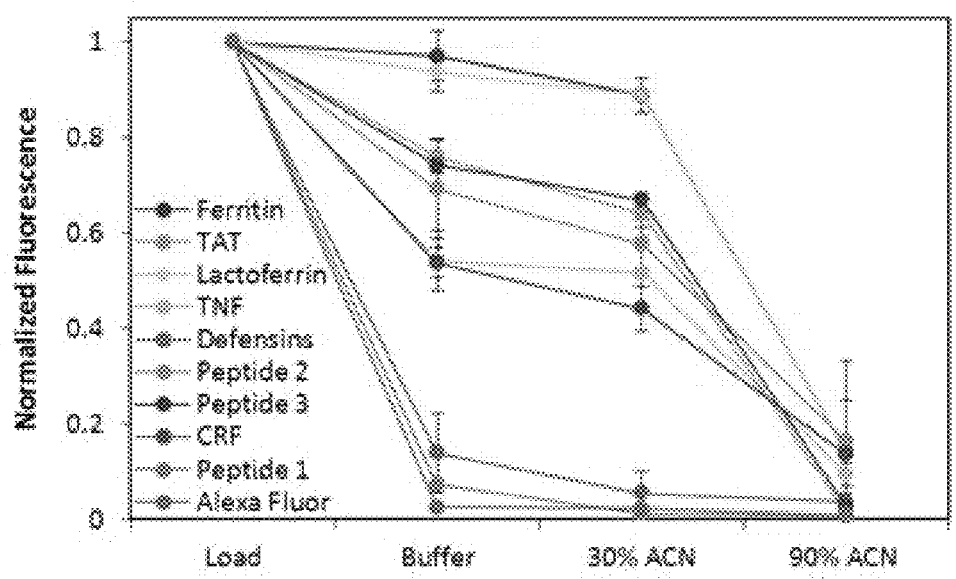
FIGS. 4A-B show SPE of Alexa Fluor and prelabeled PTB biomarkers on LMA reversed-phase monoliths in 3D printed microfluidic devices.
(A) Normalized fluorescent signal on the monolith after the load, buffer rinse, 30% ACN, and 90% ACN elution steps.
(B) Percent of the total retained analyte eluted with 90% ACN. Error bars represent the standard deviation of three replicates.
Figure 4B:
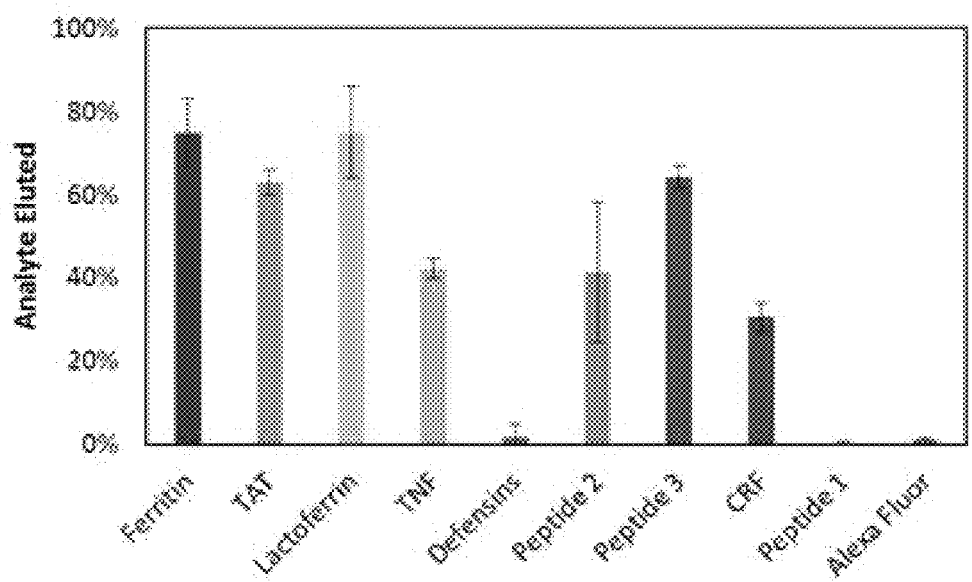

To show the versatility of this SPE system for additional analytes, a panel of nine PTB risk biomarkers (Table 1) was evaluated. These peptides and proteins were fluorescently labeled off chip, loaded on reversed-phase LMA monoliths using the established conditions, and then observed by fluorescence imaging after retention and elution. FIG. 4A shows the relative fluorescent signal present on the monoliths for each analyte after loading and flowing buffer and two different percentages of ACN, demonstrating the retention and elution characteristics of the PTB biomarkers and fluorescent label. FIG. 4B shows the percentage of each retained analyte eluted with 90% ACN. Of the nine proteins and peptides, four were well retained during the buffer rinse and 30% ACN flow through steps, with >60% of the total captured material eluted during the 90% ACN step. Three additional biomarkers were moderately retained, with >30% of the total captured material eluted with 90% ACN. The final three analytes, Alexa Fluor, peptide 1, and defensins, were largely eluted during the buffer rinse step, indicating that these analytes were not strongly retained on the monolith.

As the conditions for the elution of analytes from these monoliths were chosen to selectively elute Alexa Fluor dye and retain ferritin, it is not surprising that different retention properties were seen for other analytes. We expected retention to correlate with the size of the analyte, with large proteins well retained and small peptides having less retention. Table 1 shows that the panel of PTB biomarkers has more than a 100-fold range in masses and considerable variation in hydrophobic nature. Thus, the limited retention of peptide 1 was likely because of its small size, and the low retention of defensins was likely due to the higher relative hydrophilicity within its amino acid sequence. However, the remaining seven biomarkers were moderately or well retained, showing that this SPE system has potential to perform selective extraction through retention and elution of many proteins and peptides.

With these encouraging results for SPE of prelabeled proteins and peptides, we focused on coupling SPE with an on-chip fluorescent labeling reaction. In contrast with the previous experiments where PTB biomarkers were fluorescently labeled overnight in microcentrifuge tubes prior to extraction experiments, unlabeled biomarkers were loaded onto the monolith followed by labeling with Alexa Fluor at room temperature for 30 min prior to performing the rinsing and elution steps. Similar to FIGS. 4A-B, FIGS. 5A-B show relative fluorescence signal from monoliths after each step in the process for all 9 biomarkers plus the fluorescent label, whereas FIG. 5B further shows the percentage of each retained analyte that was eluted with 90% ACN. Analysis of these elution percentages shows moderate to good selectivity for 90% ACN elution of all nine biomarkers relative to the Alexa Fluor label, whose elution is complete in 30% ACN. These results show the ability to perform on-chip fluorescent labeling of proteins and peptides having a variety of masses and hydrophobicities, with selective retention relative to the fluorescent dye. Importantly, our results also demonstrate the first use of 3D printed devices for on-chip labeling and purification of an entire panel of PTB biomarkers. Our data further establish the ability to achieve good retention of all nine PTB biomarkers in SPE combined with selective elution of excess dye prior to biomarker elution, all under identical conditions, a key step for streamlined on-chip sample preparation.

Figure 5A:
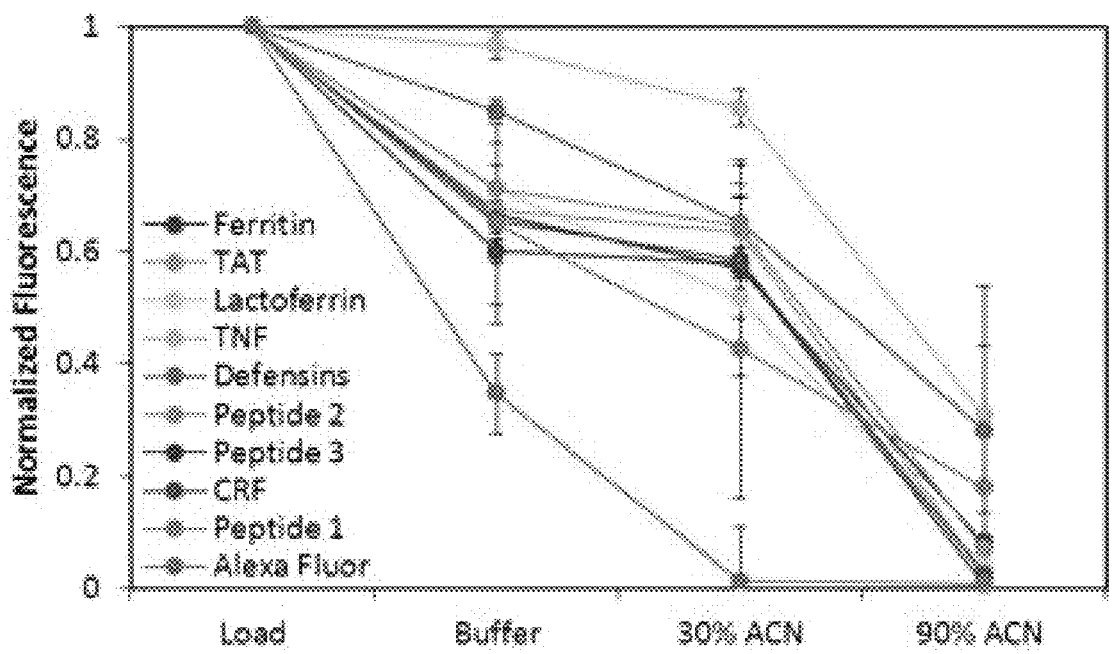
FIGS. 5A-B show SPE and on-chip fluorescent labeling of PTB biomarkers on LMA reversed-phase monoliths.
Figure 5B:
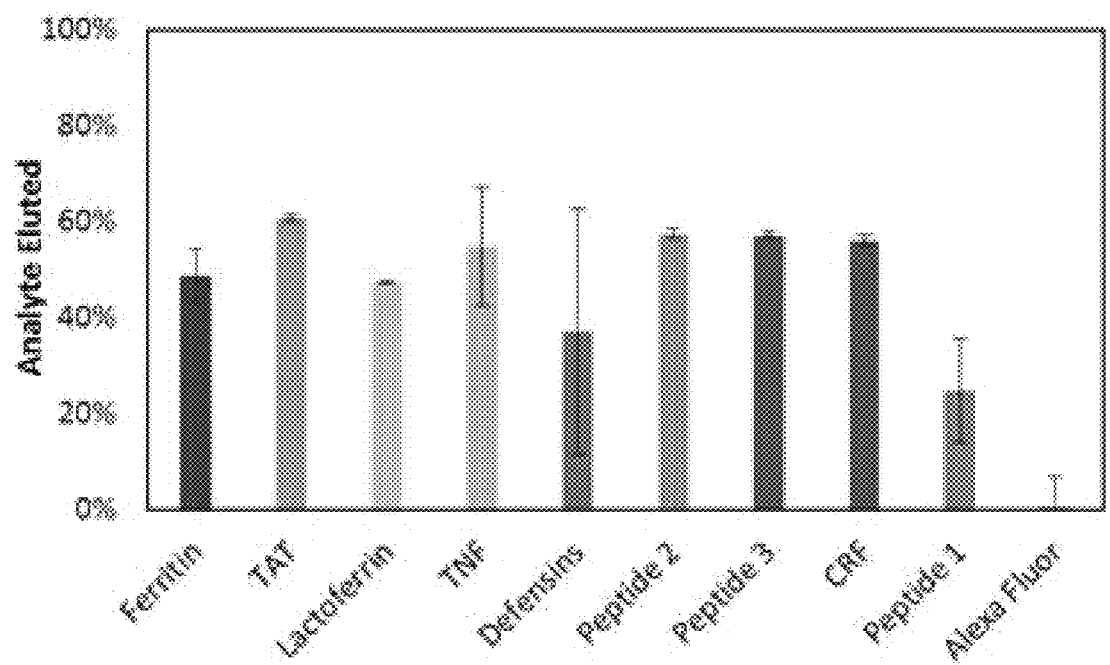
Figure 6:
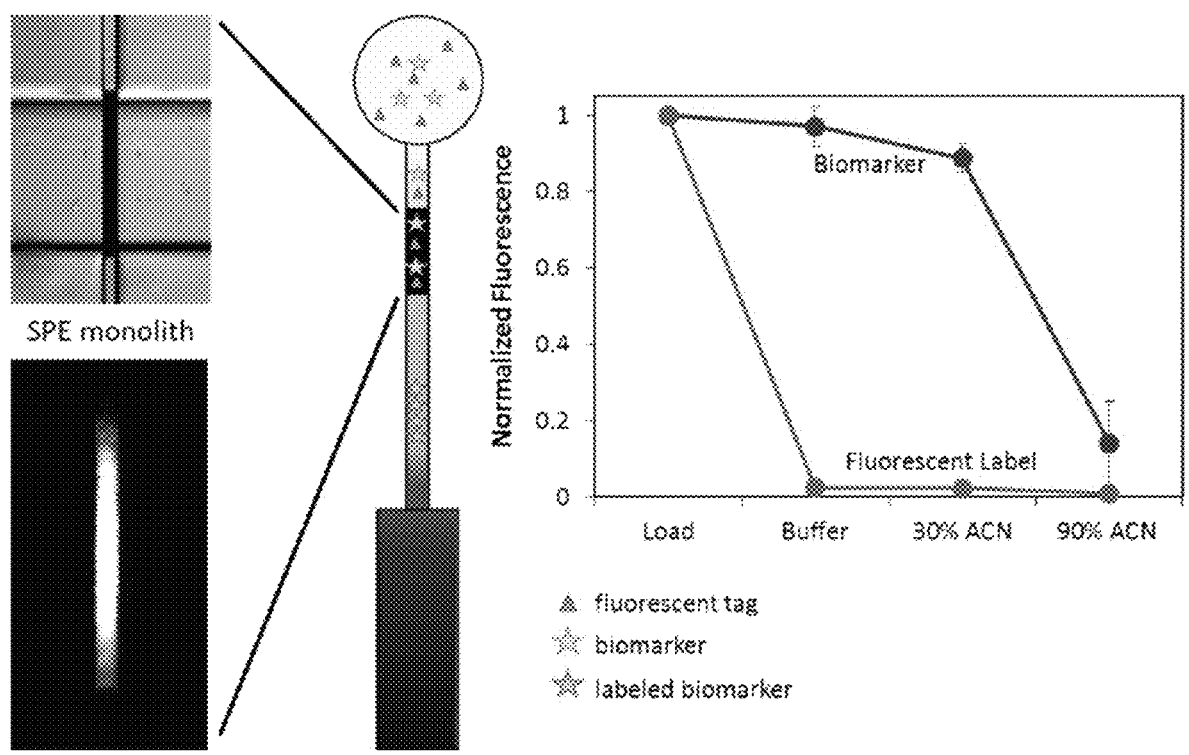
FIG. 6 shows a microfluidic monolith region imaged with brightfield microscope and with fluorescence imaging for captured and fluorescently labeled biomarker. The graph shows that adherent fluorescent labels are easily washed from the monolith with buffer solution without significantly affecting the captured biomarker, and that the captured biomarker can be separately eluted with 90% acetonitrile solution.

Our work with on-chip labeling in FIGS. 5A-B also show that, unlike for the prelabeled biomarkers (FIGS. 4A-B), retention for peptide 1 and defensins is significantly increased compared to the fluorescent dye. Additionally, some biomarkers including TNF and defensins showed incomplete elution with 90% ACN, as demonstrated by residual fluorescent signal (FIG. 5A). Without being bound to any particular theory, we hypothesized that these differences were due to the longer (30 min) labeling/incubation time, which increased interaction with the reversed-phase monolith for retention. To test the effect of the incubation time, peptide 1 prelabeled with Alexa Fluor was loaded with a 30-min extraction period prior to rinsing and elution. This extension of the extraction period raised the percentage of peptide 1 eluted with 90% ACN to >25%, the same as observed for peptide 1 during on-chip labeling experiments. Thus, retention of small or hydrophilic analytes can be improved by increasing extraction time, further extending the utility of our SPE system to a variety of peptide and protein analytes. Although this increased interaction time may result in incomplete elution, it does not prevent future downstream analysis of these PTB biomarkers. Use of a mixed mode sorbent monolith could be investigated in a future study if needed to improve retention of small or hydrophilic analytes without deteriorating elution.

CONCLUSIONS

In this work, we demonstrated the feasibility of using 3D printed microfluidic devices to combine SPE and fluorescent labeling of nine individual analytes in a disease risk biomarker panel. The use of 3D printing for fabrication can make such devices widely available to other researchers. Moreover, 3D printing streamlines the integration of microfluidic assay components such as valves and pumps and makes possible the combination of SPE and labeling with further on-chip sample preparation or separation steps, including chromatography or electrophoresis. Future integration of 3D printed, integrated pumps and valves along with point detection should also allow for more thorough tracking of analytes via mass balance calculations. Furthermore, this work is the first to evaluate the entire panel of nine PTB biomarkers in a miniaturized assay, which constitutes an important step toward the development of a complete PTB risk diagnostic. Finally, the ability for these processes to be applied to analytes that have different masses or hydrophobicities demonstrates the broad versatility 3D printed microfluidic SPE systems for use in other peptide- and protein-based analysis applications.

Except in the examples, or where otherwise expressly indicated, all numerical quantities in this description indicating amounts of material or conditions of reaction or use are to be understood as modified by the word "about" in describing the broadest scope of the invention. Practice within the numerical limits stated is generally preferred. The first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

Unless indicated otherwise, all technical and scientific terms used herein have the same meaning as commonly understood by one of ordinary skill in the art to which this invention belongs.

Throughout this application, where publications are referenced, the disclosures of these publications in their entireties are hereby incorporated by reference into this application to more fully describe the state of the art to which this invention pertains.

It is also to be understood that this invention is not limited to the specific embodiments and methods described below, as specific components or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "or" is understood to mean "and/or".

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. When one of these three terms is used, the presently disclosed and claimed subject matter can include the use of either of the other two terms.

What is claimed is:

1. A method of identifying a presence or an amount of a biomolecule, comprising:
   providing a porous, monolith substrate from a 3D printer, the monolith substrate further comprising:
   one or more monolith columns fluidly connected to one or more vacuum-attachment ports, a side, a top, and a bottom;
   loading an analyte containing sample into the one or more monolith columns;
   loading a solvent into the one or more monolith columns, thereby eluting the biomolecule from the one or more monolith columns; and
   identifying the presence or the amount of the biomolecule from the analyte containing sample,
   wherein the one or more monolith columns are made from polymerized lauryl methacrylate monomer, the one or more vacuum-attachment ports comprise one or more horizontal vacuum-attachment ports located horizontally in relation to the top and the bottom of the monolith substrate, the one or more horizontal vacuum-attachment ports comprises an end that protrudes from the side of the monolith substrate, and the biomolecule is a protein.

2. The method of claim 1, wherein the steps of loading further comprise applying a vacuum pressure to the one or more horizontal vacuum-attachment ports.

3. The method of claim 1, wherein the step of loading an analyte containing sample further comprises fluorescently tagging the biomolecule.

4. The method of claim 1, wherein the one or more monolith columns is a plurality of monolith columns.

5. The method of claim 4, wherein the one or more horizontal vacuum-attachment ports is a plurality of horizontal vacuum-attachment ports and wherein each monolith column of the plurality of monolith columns is in fluid communication with a corresponding horizontal vacuum-attachment port of the plurality of horizontal vacuum-attachment ports.

6. A system for solid-phase extraction and on-chip fluorescent labeling, comprising:
   an extraction chip with a porous, monolith substrate from a 3D printer, the monolith substrate further comprising:
   one or more monolith columns fluidly connected to one or more vacuum-attachment ports, a side, a top, and a bottom;
   a buffer solution;
   a loading solution;
   a fluorescent labeling solution; and
   a first elution solution,
   wherein the one or more monolith columns are made from polymerized lauryl methacrylate monomer, the one or more vacuum-attachment ports comprise one or more horizontal vacuum-attachment ports located horizontally in relation to the top and the bottom of the monolith substrate, the one or more horizontal vacuum-attachment ports comprises an end that protrudes from the side of the monolith substrate.

7. The system of claim 6, further comprising a pump in fluid communication with the one or more horizontal vacuum-attachment ports.

8. The system of claim 6, wherein the one or more monolith columns is a plurality of monolith columns.

9. The system of claim 8, wherein the one or more horizontal vacuum-attachment ports is a plurality of horizontal vacuum-attachment ports and wherein each monolith column of the plurality of monolith columns is in fluid communication with a corresponding horizontal vacuum-attachment port of the plurality of horizontal vacuum-attachment ports.

10. The system of claim 6, further comprising a second elution solution.

11. A method of concentrating a target analyte, comprising:
   providing a porous, monolith substrate from a 3D printer, the monolith substrate further comprising:
   one or more monolith columns fluidly connected to one or more vacuum-attachment ports, a side, a top, and a bottom;

loading an analyte containing sample into the one or more monolith columns in which the target analyte adheres to the one or more monolith columns;

loading a buffer solution through the one or more monolith columns; and eluting the target analyte from the one or more monolith columns, wherein the one or more monolith columns are made from polymerized lauryl methacrylate monomer, the one or more vacuum-attachment ports comprise one or more horizontal vacuum-attachment ports located horizontally in relation to the top and the bottom of the monolith substrate, and the one or more horizontal vacuum-attachment ports comprises an end that protrudes from the side of the monolith substrate.

12. The method of claim 11, wherein the one or more monolith columns is a plurality of monolith columns.

13. The method of claim 12, wherein the one or more horizontal vacuum-attachment ports is a plurality of horizontal vacuum-attachment ports and wherein each monolith column of the plurality of monolith columns is in fluid communication with a corresponding horizontal vacuum-attachment port of the plurality of horizontal vacuum-attachment ports.

14. The method of claim 11, further comprising rinsing the one or more monolith columns, after the step of loading the buffer solution.

15. A method of concentrating and fluorescently labeling a target analyte, comprising:
providing a porous, monolith substrate from a 3D printer, the monolith substrate further comprising:
one or more monolith columns fluidly connected to one or more vacuum-attachment ports, a side, a top, and a bottom;
loading an analyte containing sample into the one or more monolith columns in which the target analyte adheres to the one or more monolith columns;

loading a fluorescent labeling solution through the one or more monolith columns, thereby generating a labeled target analyte;

loading a buffer solution through the one or more monolith columns; and eluting the labeled target analyte from the one or more monolith columns, wherein the one or more monolith columns are made from polymerized lauryl methacrylate monomer, the one or more vacuum-attachment ports comprise one or more horizontal vacuum-attachment ports located horizontally in relation to the top and the bottom of the monolith substrate, and the one or more horizontal vacuum-attachment ports comprises an end that protrudes from the side of the monolith substrate.

16. The method of claim 15, wherein the one or more monolith columns is a plurality of monolith columns.

17. The method of claim 16, wherein the one or more horizontal vacuum-attachment ports is a plurality of horizontal vacuum-attachment ports and wherein each monolith column of the plurality of monolith columns is in fluid communication with a corresponding horizontal vacuum-attachment port of the plurality of horizontal vacuum-attachment ports.

18. The method of claim 15, further comprising rinsing the one or more monolith columns, after the step of loading the buffer solution.

* * * * *

SEQUENCE LISTING

```
<160> NUMBER OF SEQ ID NOS: 3

<210> SEQ ID NO 1
<211> LENGTH: 19
<212> TYPE: PRT
<213> ORGANISM: Homo sapiens

<400> SEQUENCE: 1

Gln Leu Gly Leu Pro Gly Pro Pro Asp Val Pro Asp His Ala Ala Tyr
1               5                   10                  15

His Pro Phe

<210> SEQ ID NO 2
<211> LENGTH: 41
<212> TYPE: PRT
<213> ORGANISM: Homo sapiens
```

```
<400> SEQUENCE: 2

Asn Val His Ser Ala Gly Ala Ala Gly Ser Arg Met Asn Phe Arg Pro
1               5                   10                  15

Gly Val Leu Ser Ser Arg Gln Leu Gly Leu Pro Gly Pro Pro Asp Val
            20                  25              30

Pro Asp His Ala Ala Tyr His Pro Phe
        35                  40

<210> SEQ ID NO 3
<211> LENGTH: 41
<212> TYPE: PRT
<213> ORGANISM: Homo sapiens

<400> SEQUENCE: 3

Asn Val His Ser Ala Gly Ala Ala Gly Ser Arg Met Asn Phe Arg Pro
1               5                   10                  15

Gly Val Leu Ser Ser Arg Gln Leu Gly Leu Pro Gly Pro Pro Asp Val
            20                  25              30

Pro Asp His Ala Ala Tyr His Pro Phe
        35                  40
```